Figure 1:
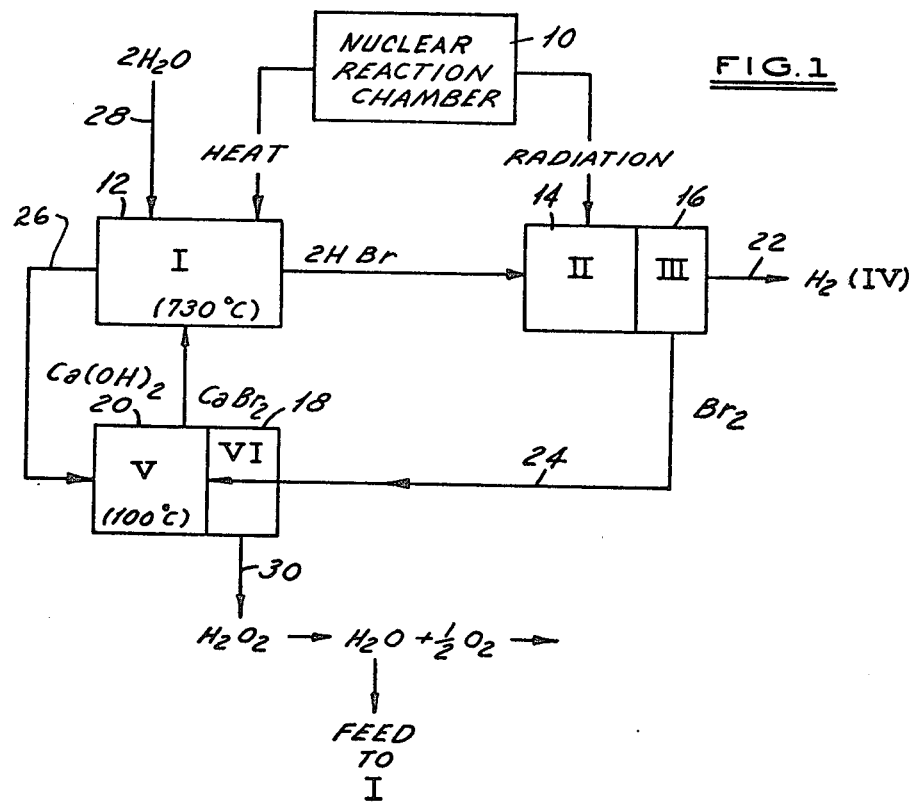

United States Patent [19]

Gomberg

[11] 4,140,603
[45] Feb. 20, 1979

[54] MULTI-STEP CHEMICAL AND RADIATION PROCESS FOR THE PRODUCTION OF GAS

[75] Inventor: Henry J. Gomberg, Ann Arbor, Mich.

[73] Assignee: Texas Gas Transmission Corporation, Owensboro, Ky.

[21] Appl. No.: 674,616

[22] Filed: Apr. 7, 1976

Related U.S. Application Data

[63] Continuation-in-part of Ser. No. 416,997, Nov. 19, 1973, abandoned.

[51] Int. Cl.² .................................................. B01J 1/10
[52] U.S. Cl. ....................... 204/157.1 H; 204/157.1 R
[58] Field of Search ................. 204/157.1 H, 157.1 R; 423/481, 648, 457

[56] References Cited

PUBLICATIONS

Ellis et al., Chemical Action of Ultraviolet Rays, 1941, p. 346.
Allen, Chemical Effects of Ionizing Radiation on Simple Inorganic Compounds & Aqueous Solutions, 1948, pp. 4 & 6.

Primary Examiner—Howard S. Williams
Attorney, Agent, or Firm—Laurence R. Brown

[57] ABSTRACT

A multi-step chemical and radiation process for the production of gas which includes mixing water and chlorine gas, heating the mixture to a temperature of about 800° C. to produce hydrogen chloride and oxygen and subjecting the hydrogen chloride to radiation to produce hydrogen and chlorine gas. The process also includes the recycling of the resulting halogen into the basic process.

7 Claims, 2 Drawing Figures

MULTI-STEP CHEMICAL AND RADIATION PROCESS FOR THE PRODUCTION OF GAS

This is a continuation-in-part of U.S. Ser. No. 416,997 filed Nov. 19, 1973 (now abandoned).

This invention relates to a Multi-Step Chemical and Radiation Process and more particularly to the combining of radiolytic and chemical reactions in a particular sequence to obtain a final product.

It is an object of the present invention to provide a combination of processes, chemical and radiolytic, which increase the efficiency of the use of radiation energy.

BACKGROUND OF THE INVENTION

Much work is presently being done to ignite and burn fusion fuel such as, for example, deuterium-tritium in pellet form. While there are a number of different approaches to this problem, one of them includes the utilization of a source of energy from a laser and particular pellet configurations to achieve ignition and burn in a reaction chamber. Recent activity shows the successful generation of high intensity neutrons by this method. One publication UCRL 76857, July 1975 from Lawrence Livermore Laboratory describes a most intense source of DT fusion neutrons currently available. Laser Focus, Sept. 1975, pp. 39–42, shows evidence of large neutron yields from both KMS Fusion, Inc. and Livermore. Thus fusion reactions are a preferred source of radiation, although many other sources of gamma, alpha, X ray and neutron radiation devices are currently available in commercial form.

U.S. Patents which illustrate generally the apparatus which can be used in this type of system are:

Whittlesey: 3,378,446—Apr. 16, 1968
Daiber: 3,489,645—Jan. 13, 1970
Hedstrom: 3,762,992—Oct. 2, 1973

It has been proposed to use nuclear reactors for the dissociation of water to hydrogen and oxygen in one step, at least as early as 1962 in the British Pat. No. 908,469 to Manfred Siebker, for example. The one-step process can take place from high temperature but preferably involves radiation dissociation caused by neutrons, alpha, or X radiation caused by exposing the target molecule directly to radiation from a fusion or fission source to produce the desired product. The use of radiation from thermo-nuclear fusion reactors has a significant advantage over the use of radiation from fission in such processes.

When the fission process is used as a radiation source materials must be exposed directly to the fission fragments in order to obtain effective energy transfer and this also requires that the material be exposed to uranium or plutonium fuel directly. In some instances, the use of uranium dust to be mixed with the reactants is recommended. (See *Advances in Nuclear Science & Technology*, Vol. 1, Edited by Henley and Kouts, Academic Press, 1962, P. 298.) The result is a rather severe contamination of the products by radioactive fission fragments and by the fuel particles themselves. Direct exposure is necessary since about 80 percent of the fission energy is contained in the fission fragments.

In thermonuclear fusion of D-T, 80 percent of the energy is released as fast neutrons and the remaining 20 percent of the energy is released as alpha and X rays. In the fusion reaction, the material to be processed may be exposed directly to the radiation or may be exposed while being confined in a separate container. The latter condition is particularly appropriate for the neutron exposure since the neutrons have an effective penetration characteristic.

Thus, the use of fusion devices, with the resulting high energy neutrons, as well as alpha and X rays, allows for the direct interaction of the radiation with the reactants while limiting radioactivity problems to those caused by neutron capture. This difference alone is extremely significant in considering the use of thermonuclear reactors for cheminuclear processing.

OBJECTS OF THE INVENTION

It is therefore an object of the present invention to utilize a combination of chemical, thermal and radiolytic energy in a multiple step process deriving output products from a basic feed material which process is particularly advantageous with neutron radiation preferably obtained by the fusion or fission process. In addition, the process is relatively simple and the end products may be more readily separated.

It is a further object to provide a system wherein a material is reacted with the basic feed material and is reformed in the process to be completely recycled. The process thereby forms with the feed material a chemically recyclable molecule and a new radiosensitive molecule from which can be more easily derived a principal product, and a by-product.

Other objects and features of the invention will be apparent in the following description and claims wherein the principles of the invention and the use thereof, together with the best mode presently contemplated for the practice of the invention, are set forth.

Drawings accompany the disclosure and the various views thereof may be briefly described as:

FIG. 1, a block diagram of a system for utilizing the process; and

Figure 2:
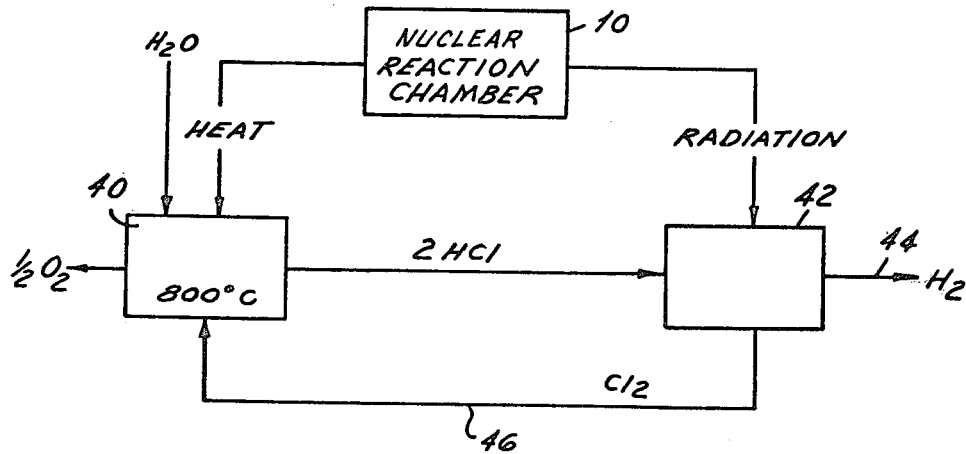

FIG. 2, a simplified block diagram for a modified cycle.

DESCRIPTION OF THE INVENTION

Molecular fragmentation by radiation or "radiolysis" is a known phenomenon. Consider for example *Advances in Nuclear Science and Technology*, Vol. 1, 1962, Academic Press, Pages 252ff. It can be used to form desirable or useful molecular species from feed materials containing larger molecules.

Examples are the formation of hydrogen and oxygen by radiolytic decomposition of water and also the formation of carbon monoxide and oxygen by radiolytic decomposition of carbon dioxide. However, the yield or "G" value for the radiolytic reaction may be too low to be useful or economical. A commonly quoted G value for the yield of hydrogen molecules for radiation of clean liquid water by gamma rays is 0.5. (The G value is the number of product molecules formed per hundred electron volts of energy absorbed.)

The present invention involves the combination of processing steps of chemical reactions involving chemical and heat energy and those involving radiolytic processes. Depending on the particular material used, the chemical reaction may originate the process followed by a radiolytic step, or an initial radiolytic step may produce molecules suitable for a chemical reaction to produce the final desired product. The multi-step process is so arranged that, except for secondary losses by escape evaporation, transmutation and so forth, all the chemicals, except the original feed material, are completely recycled. The original feed material is selected to provide the final desired product as is the case in the one-step radiolytic process of combining chemical and radiolytic steps. The feed products and the yield products may be the same as in the one-step process. One important objective of the combined steps is to utilize the radiolytic step for exposure of a molecule which is specifically designed to have a high G value. Accordingly, when the chemical reaction is to be followed by the radiolytic process, the chemical reaction is used to create from a combination of the feed material and a chemically recyclable molecule a new radio-sensitive molecule and a by-product. After the more efficient resulting procedure of radiolysis of the newly-created radio-sensitive molecule, one fragment is collected as a desired product and the second fragment is reacted with the by-product to recreate both the original recyclable molecule and to provide the second desired product. As an example, an alkaline earth salt and an alkali hydroxide may be reacted to form an alkaline earth hydroxide and an alkali halide. The alkali halide is then subjected to radiolytic dissociation.

One example is the production of hydrogen and oxygen from water as the feed, with calcium bromide as the recyclable molecule.

(A) $CaBr_2 + 2H_2O \xrightarrow[\text{heat}]{730°\text{ C}} Ca(OH)_2 + 2HBr$ (B) $2HBr + \text{(radiation)} \longrightarrow H_2 + Br_2$
    $(G = 9.7)^*$
    $(G = 16+)^{**}$ (C) $Ca(OH)_2 + Br_2 \longrightarrow CaBr_2 + H_2O_2$ (D) $H_2O_2 \longrightarrow H_2O + \frac{1}{2} O_2$ \* Lee & Armstrong, Radiolysis of Gaseous Hydrogen Bromide. International J. Applied Radiation, Isotopes, Vol. 19, P. 586 (1968).
\*\* For low pressure. Boyd et al. Low Pressure Anomalies in..Radiolysis of Gases. Rad. Research 40, P. 255 (1969).

It will be noted that the calcium bromide is conserved and with the input of some heat and radiation, hydrogen and oxygen are formed. Thus, water, heat and ionizing radiation are the only consummable supplies. The hydrogen bromide molecule is known to be truly radiosensitive and is therefore better adapted as a molecule for dissociation by radiolytic processes to produce hydrogen than water.

In a second example, the process starts with a suitable radiation sensitive molecule and the products of radiolysis used in a chemical reaction. As an example, carbon dioxide is dissociated to carbon monoxide and oxygen. The carbon monoxide is then reacted with water to form carbon dioxide, hydrogen and oxygen.

$CO_2 + \text{radiation} \xrightarrow{NO_2^-} CO + \frac{1}{2} O_2$
    $G = (10+)$ $CO + H_2O \xrightarrow{\text{Heat}} CO_2 + H_2$ In the above reaction, we note that the carbon dioxide can be recycled. The only feed material, namely water, is consumed through conversion to hydrogen and oxygen. It will be appreciated that in a preferred embodiment, the heat needed for the thermochemical reactions (as well as the radiation energy) can be derived from the fusion reaction. Reference is made to *Advances in Nuclear Science & Technology*, Vol. 1, P. 262,309 ff. and in The Journal of Chemical Physics, Vol. 26, No. 6 June 1957, pp. 1724 ff., where similar processes have been reported in connection with fission energy sources using fission fragment energy.

In this invention, however, neutron energy is preferred as a source which introduces less radioactive contamination. Copending applications, Ser. Nos. 416,998 and 417,000, filed Nov. 19, 1973 are directed to the specific examples above recited and general aspects of this process.

A third example involves the use of water and chlorine. The reaction proceeds as follows:

$H_2O + Cl_2 \xrightarrow{800°\text{ C}} 2HCl + \frac{1}{2} O_2$ $2HCl + \text{radiation} \longrightarrow H_2 + Cl_2$
$G = 8$ With reference to the first example above, an alkaline earth salt is reacted with water in a thermochemical reaction as previously indicated. With reference to FIG. 1, it will be seen that heat may be transferred to a vessel 12 directly from a fusion reaction chamber 10 or by means of a heat exchange medium or by heat exchange with hot products which have been exposed to radiation in a vessel 14 which may be referred to as a radiolysis chamber. A vessel 18 is connected to vessel 16 by pipe or conveyor 24 to pass the bromine gas from chamber 16, and a reaction chamber 20 is provided to reform the alkaline earth hydroxide. Thus, with reference to the diagram in FIG. 1, in chamber 12 a hydrolyzable alkaline earth salt is reacted with water by heating the mixture to form the alkaline earth hydroxide and the hydrogen halide. Examples of this reaction are:

(A) $CaBr_2 + 2H_2O \xrightarrow{730°\text{ C.}} Ca(OH)_2 + 2HBr$ (B) $CdBr_2 + 2H_2O \rightarrow Cd(OH)_2 + 2HBr$ (C) $CaCl_2 + 2H_2O \rightarrow Ca(OH)_2 + 2HCl$ The hydrogen halide is removed from vessel 12 and transferred to vessel 14 where it is subjected to a radiation source, preferably neutron radiation resulting from nuclear fusion in the reaction chamber 10. Thus, the hydrogen halide is exposed to neutrons, plus alpha rays and X rays. Dissociation of the gas takes place and the radiolytic product of hydrogen gas will exit through a suitable conduit 22 and the halide gas will be carried through a suitable conduit 24 to the chamber 18. Well-known processes of separation will take place in chamber 16 so that the halide gas can be separated from the principal product, hydrogen. The hydrogen is pumped away for storage and eventual use as a fuel, either in the pure state or as a manufactured hydrocarbon.

The halide gas is reacted with the alkaline earth hydroxide resulting from the chemical reaction which has reached chamber 20 through a conduit 26. Thus, the hydrolyzable salt is reformed in the chamber 20 and can be suitably transferred back to chamber 12 to react with the fresh feed water which is entering through the conduit 28. The product water and oxygen from chamber 20 are pumped away through conduit 30. If desired, the product water can be returned to the conduit 28 and the oxygen may be recovered if desired for further use elsewhere.

In FIG. 2, a system is shown for the reaction of the third example, above-described, utilizing chlorine. Other halides might be used. The radiation source comprising preferably nuclear reaction chamber 10 is positioned to transfer heat to the chemical reaction vessel 40 and to transfer radiation to the radiolytic chamber 42. In the cycle involved here, chlorine will be introduced into chamber 40 along with water, and under the influence of heat in the area of 800° C., (see *Chlorine: Its Manufacture, Properties and Uses,* J. S. Sconce, Editor-in-Chief, Van Nostrand Reinhold Co., 1962), there will be produced oxygen and hydrochloric acid which acid passes to the chamber 42 where it is subject to dissociation into hydrogen and chlorine by radiolytic action. These gases are suitably separated in chamber 42 so that hydrogen may pass out of the conduit 44 and chlorine may move through the conduit 46 back to the chemical reaction chamber 40. The separation can be effected by refrigeration to yield a mixture of vapor and liquid, followed by fractional distillation and scrubbing to separate hydrogen, chlorine, and unconverted hydrogen chloride.

The multi-step concept is applicable to many processes and products. The principal points are:

(a) Initially introduction, or creation, of a radiation sensitive molecule by a chemical step, (b) By radiolysis, dissociation of the molecule to create a desired chemical product which can be removed from a feed material, (c) Recycling of all chemicals except the feed material constituents at least one of which is the desired final product.

The major objective of the combined process is to improve efficiency of production of the final product and to provide a method of recovering it without substantial recombination by means of radiolysis of a selected radiation sensitive molecule with a high G value.

It should be noted, however, that the fraction of the input radiation energy which is not utilized directly for radiolysis may be absorbed and converted to heat. The system can therefore be designed so that the driving high energy radiation and heat are both supplied from one and the same source, i.e., fast neutrons and other radiations from thermonuclear reaction.

A particularly advantageous feature of these processes when using water, unlike direct radiolysis of water, where the hydrogen and oxygen emerge together, is that the hydrogen and oxygen are produced separately in different steps and in physically separated zones of the equipment. This reduces explosion hazard and makes separation and purification of the final product easier.

A significant advantage of fusion reaction is the efficient production of high energy neutrons, and the ease in which chemicals and particularly acids can be isolated from the central reaction chamber because of the penetration characteristics of the neutrons which can therefore pass to an external chamber 14 or 42 for reaction with the high G materials therein.

What is claimed is:

1. The improved process for producing hydrogen gas and oxygen gas from feed water by subjection to radiation, comprising the steps of,
    (a) feeding water into the presence of a halogen,
    (b) heating said mixture to a temperature to produce a hydrogen halide and oxygen,
    (c) separating said oxygen in gaseous form,
    (d) subjecting the hydrogen halide to radiation to produce hydrogen in gaseous form, and
    (e) separating the hydrogen gas from the halogen, and
    (f) recycling the original halogen.

2. A process as defined in claim 1 in which the halogen is chlorine.

3. A process as defined in claim 2 including the step of deriving said temperature and said radiation from a fusion reaction.

4. A process as defined in claim 2 including the step of deriving said temperature and said radiation from a nuclear reactor producing neutrons, alpha rays, gamma rays, and X ray radiation.

5. The improved two-step process of decomposing water to obtain hydrogen gas and oxygen gas with a nuclear reactor, comprising in combination, mixing the water with a halogen at a temperature induced from said reactor high enough to produce gaseous oxygen and a hydrogen halide, and subjecting the hydrogen halide to radiation from said reactor to dissociate gaseous hydrogen therefrom.

6. The process of claim 5 wherein the radiation is primarily neutron radiation.

7. The process of claim 6 wherein the hydrogen halide is processed in a chamber outside the central reaction chamber of the nuclear reactor.

* * * * *